United States Patent [19]
Levin

[11] 3,881,034
[45] *Apr. 29, 1975

[54] RECONSTITUTED EGG PRODUCT AND METHOD OF PREPARING

[75] Inventor: Ezra Levin, Champaign, Ill.

[73] Assignee: VioBin Corporation, Monticello, Ill.

[*] Notice: The portion of the term of this patent subsequent to Sept. 21, 1988, has been disclaimed.

[22] Filed: Aug. 9, 1971

[21] Appl. No.: 170,032

Related U.S. Application Data

[63] Continuation-in-part of Ser. No. 702,174, Feb. 1, 1968, Pat. No. 3,607,304.

[52] U.S. Cl. .......... 426/541; 426/614; 426/580; 426/603; 426/424; 426/429; 426/456
[51] Int. Cl. .......................... A23l 1/32; A23b 5/02
[58] Field of Search ....... 99/113, 208; 426/211, 196, 426/178, 348, 148, 429, 480, 328

[56] References Cited
UNITED STATES PATENTS

| | | | |
|---|---|---|---|
| 2,619,425 | 11/1952 | Levin | 99/113 X |
| 3,162,540 | 12/1964 | Kline et al. | 99/210 |
| 3,201,261 | 8/1965 | Carey et al. | 99/210 |
| 3,563,765 | 2/1971 | Melnick | 99/113 |
| 3,607,304 | 9/1971 | Levin | 99/113 |

FOREIGN PATENTS OR APPLICATIONS

| | | | |
|---|---|---|---|
| 803,071 | 10/1958 | United Kingdom | 99/113 |

*Primary Examiner*—Raymond N. Jones
*Attorney, Agent, or Firm*—Burmeister, York, Palmatier Hamby & Jones

[57] ABSTRACT

A stable dried egg powder containing a reduced amount of cholesterol is made by removing the water and fat from whole raw eggs in a body of solvent at a moderate temperature below levels which would tend to cook the raw egg. The water is removed by distillation as an azeotropic mixture of a solvent and water; the fat is extracted into the solvent, the solvent drained off or filtered and further removed, except for traces, by vacuum distillation at a low temperature, an antioxidant is preferably added, water is added to the dried product, and if desired a portion of the egg fat or other additives also added, the mixture homogenized and then dried.

21 Claims, 1 Drawing Figure

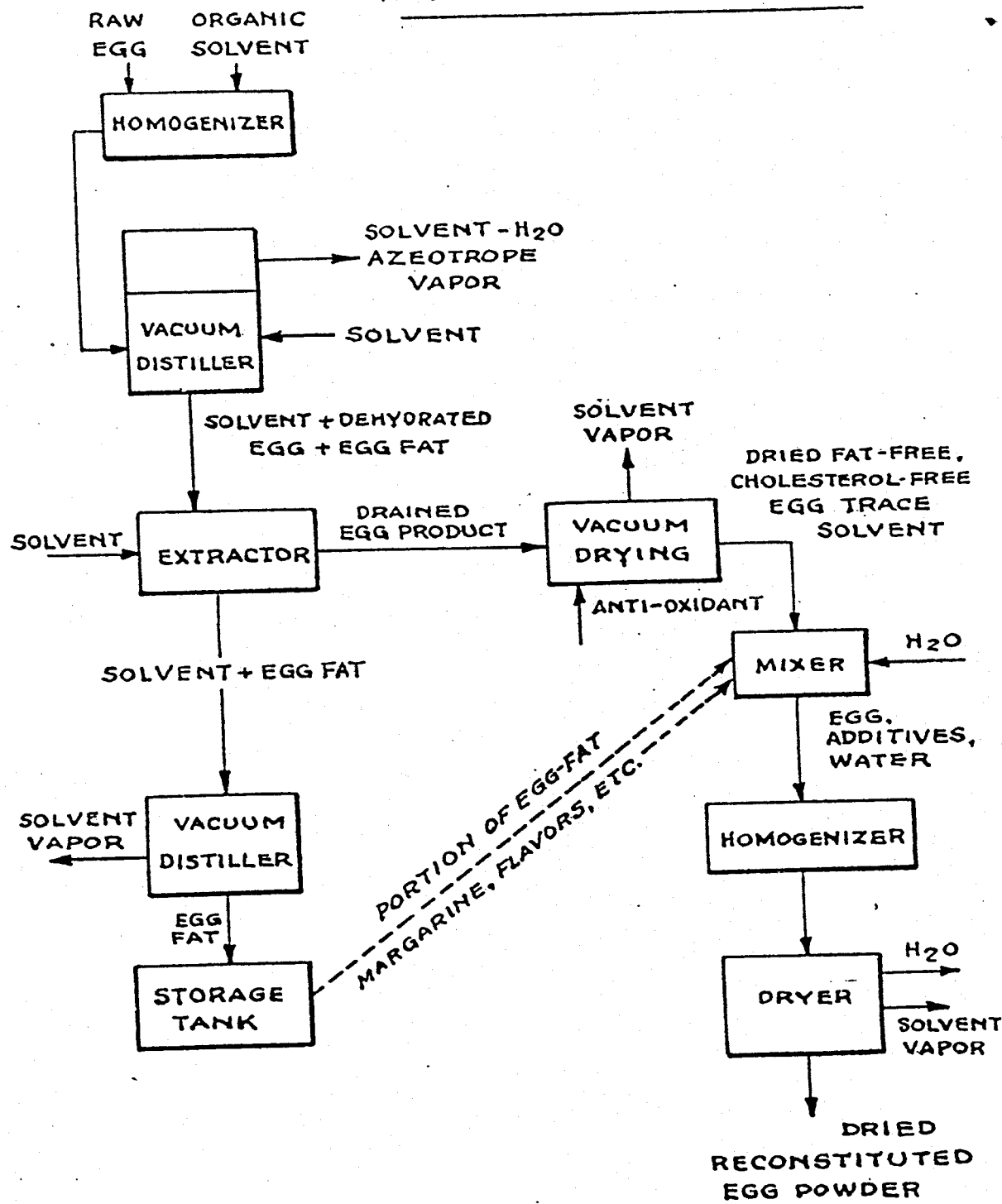

RECONSTITUTED EGG PRODUCT AND METHOD OF PREPARING

This application is a continuation-in-part of my copending application, Ser. No. 702,174, filed Feb. 1, 1968 now U.S. Pat. No. 3,607,304.

The invention relates to a dried egg product and more particularly to an improvement in dried egg powder, and process of making it.

An object of this invention is to provide a dried powdered egg product which does not become rancid and which does not undergo the so-called browning reaction which, so far as we know, occurs in spray dried egg products heretofore made.

Another object is to provide a dried powdered egg product free of or containing a reduced amount of cholesterol.

A further object is to provide a dried egg product in which all or a part of the egg fat normally present in eggs is replaced by only a portion of the egg fat, such as one-quarter, or replaced by margarine, butter or other edible fats and oils containing desirable flavors, such as butter flavor, bacon flavor or maple, smoke or fruit flavors.

Another object is to provide a reconstituted egg powder of good solubility and desirable taste.

A further object is to provide an improved process for dehydrating and defatting whole eggs, and stabilizing said product.

Another object is to provide an improved process for desolventizing eggs dehydrated by an azeotropic distillation process.

Other objects and advantages will become apparent as the following detailed description progresses, reference being had to the accompanying drawing showing a flow sheet of the process.

In accordance with this invention the dried egg product of the invention is made by removing the egg shells, mixing, preferably by homogenizing, raw whole liquid eggs with an organic solvent for the egg fat which forms an azeotrope with water, removing the water by distilling off azeotrope at below the coagulation temperature of the egg, i.e., below 140°F and preferably below 100°F and, if necessary, under reduced pressure, extracting the dehydrated egg product with fat solvent, draining or filtering off excess solvent and preferably vacuum drying the remaining solid product to remove all but trace amounts of solvent, thereby obtaining a dried fat-free and cholesterol-free egg product. This product is then mixed with water and homogenized, and then dried. The resulting product has high solubility and the fat solvent is reduced to a value of below 100 ppm. However for extra high insect resistance and freedom from Salmonella infection solvents such as ethylene dichloride and like chlorinated hydrocarbon solvents of from 60–100 ppm may be retained in the dried egg product. The term "fat-free" is used herein to refer to a product having less than five percent free fat by weight. There is also bound fat in the product, but the cholestrol is substantially in the free fat.

The presence of low levels of residual fat make it desirable to add small but effective and nontoxic levels of a fat antioxidant to the egg product before homogenizing and spray drying. It may be added to the boiling body of fat organic solvent as described in application Ser. No. 702,174, or elsewhere in the process. Such antioxidants, for example, may be butylated hydroxy toluene (BHT), butylated hydroxy anisole (BHA), propyl gallate, normal diguaiaretic acid (NDGA), or other antioxidants suitable for edible fats. The use of antioxidants in this azeotropic fat solvent process involving a drying step gives an exceptional degree of stability since it prevents the rancidity.

In another embodiment of the invention the egg fat that has been removed by the extraction process is partly replaced by the addition of egg fat to make a low cholesterol egg with good flavor. It has been found that replacement of between 15 per cent to 50 per cent of the original fat of the egg, for example 25 per cent gives a highly satisfactory balance of low cholesterol and good flavor. Further, the invention contemplates replacing all of the original egg fat to produce a whole egg powder of improved stability.

Egg fat from which the cholesterol has been removed may also be used to partially or completely replace the extracted egg fat of the process.

In this process the replacement egg fat may suitably be added to the dehydrated egg after the azeotropic distillation and draining or filtering of the fat solvent, such as, for example, to the mixture of dried defatted egg and water, after which the mixture is homogenized and dried.

Instead of adding egg fat to the fat-free dried egg, the egg fat may be only partially removed by extraction and draining so that a portion of the egg fat remains with the solvent. The solvent is then vacuum distilled away, except the minor amount which is difficult to remove by this process, and the dried egg product containing the egg fat left in the product is then mixed with water, homogenized and dried as for the case where a portion of egg fat is added to the fat free egg.

In another embodiment of the invention a reconstituted filled egg powder is obtained. In this process, instead of replacing the removed egg fat with a lesser amount of egg fat, it is replaced with various other edible materials, especially cholesterol-free edible fats and oils and flavoring compounds with or without fat or oils. For example, the egg oil is replaced by butter, corn oil, coconut oil, soybean oil, coconut oil flavored with butter flavor, margarine, cottonseed oil containing butter flavor, bacon-flavored fat. Desirable flavors such as maple, fruit flavors with or without fat may be used. The process used is preferably that described for incorporating a reduced amount of egg fat and the products obtained are of like stability and solubility, and very low solvent content. An antioxidant is preferably added to any edible oils added to the product.

It is preferred to introduce the raw egg into the heated body of fat organic solvent as an intimate mixture of the liquid egg and the same fat organic solvent. In particular, the raw egg is preferably emulsified in a fat organic solvent with the aid of a conventional homogenizer, such as that provided by the Cherry-Burrell Corporation. Different proportions of egg and fat organic solvents may be used to prepare the emulsified mixture but generally an excess volume of solvent is preferred, such as about 4 volumes of solvent to about 1 volume of raw egg. The emulsified egg fat solvent mixture may then be below the surface of the heated body of fat solvent heated at moderate temperature levels. Practitioners will appreciate that the body of fat organic solvent will be heated at the moderate temperature levels under decreased pressure so that the fat organic solvent boils at the reduced temperature and thereby forms an azeotrope of the water in the raw egg and the fat organic solvent. The pressure level is applied in a pressure vessel in the recognized manner of the art to attain the formation of the azeotrope at its selected and desired temperature level. The emulsified egg and solvent mixture may also be introduced in an atomized form by delivering the emulsified mixture under pressure through spray jets underneath the surface of the body of boiling fat solvent.

Various fat organic solvents may be used which can form an azeotrope in water, and many types of such solvents are described in the foregoing U.S. Pat No. 2,503,313. In general, halogenated hydrocarbons are preferred such as perchlorethylene, trichlorethylene and, particularly, ethylene dichloride. Alcohol may also be used.

The following examples are presented merely to illustrate ways to practice the invention. Such examples should not be construed, however, as representing the only way in which the improved egg product may be prepared and evaluated.

EXAMPLE 1

Egg Product Preparation by Azeotropic Distillation with Ethylene Dichloride

One volume of raw whole egg in liquid form is mixed with 4 volumes of ethylene dichloride in a Cherry-Burrell homogenizer, and the emulsified mixture is then introduced into a pressure vessel as a fine spray below the level of the surface of a boiling body of ethylene dichloride maintained at a temperature of no more than 40°C, viz. 35°C, and at a pressure of about 215 mm of mercury.

An azeotrope of solvent and water is removed by distillation until substantially all the water from the raw egg is withdrawn. The temperature of the egg solvent mixture is maintained below about 40°C throughout the distillation processing, and completion of the distillation process is indicated by an increase in the boiling temperature of the slurry of solvent, fat and egg solids from the boiling point of the azeotrope to the boiling point of the solvent. After substantial dehydration, the ethylene dichloride is removed by draining through a screen opening in the vessel and fresh solvent is added to the product which has been dried of water. The mixture is stirred and the solvent is again removed by draining through the opening in the vessel.

Two one-hundredths of one per cent by weight of fat present of butylated hydroxy toluene (BHT) was mixed with the drained egg product and 5 volumes of water added to give a flowable mixture.

This mixture is then homogenized in a conventional homogenizer, such as that provided by the Cherry-Burrell Corporation.

The homogenized composition is then dried in a conventional dryer. The homogenized composition is at all times maintained at a temperature below the coagulating temperature of egg, i.e., a temperature of 40°C and preferably 35°C. Conventional drying equipment may be used either with or without vacuum.

The product obtained is a dry, stable egg powder, substantially fat free and substantially free of cholesterol, i.e. the free fat content of the product has been reduced to about one per cent by weight with a corresponding reduction in cholesterol. It has trace levels of ethylene dichloride intimately contacted with the individual particles to such a degree that the ethylene dichloride content of the particles is less than 100 ppm.

EXAMPLE 2

Preparation of Egg Product by Azetropic Distillation with Ethylene Dichloride

The process steps of Example 1 are essentially followed in that the emulfisifed mixture of raw egg and ethylene dichloride is delivered as a spray into the body of boiling ethylene dichloride at a point just below the surface. The pressure in the closed pressure heating vessel is about 215 mm of mercury. An azeotrope of solvent and water is removed by distillation until substantially all the water from the raw egg is withdrawn. The temperature of the egg solvent mixture is maintained below about 40°C throughout the distillation processing. After substantial dehydration, the ethylene dichloride, containing the fat, is removed by draining through a screen opening in the vessel and fresh solvent is added to the water-dried product. The mixture is stirred and the solvent is again removed by draining through the opening in the vessel.

The process of Example 1 is then varied, however, in that the drained egg product was then dried in a vacuum dryer at 200 mm of mercury and 30°C for three hours.

The dried product was mixed with water, homogenized and dried as in Example 1.

The product was the same as in Example 1, except the product contained less ethylene dichloride, the amount varying depending upon the time of vacuum drying, and time and temperature of the final drying step, as low as 10 ppm and less being obtained.

EXAMPLE 3

The process of Example 2 was repeated except that the ethylene dichloride from the extractor which contains the egg fat was vacuum distilled to remove the solvent and obtain the egg fat, and egg fat in amount such as to bring the dried fat-free egg to 25 per cent of its normal level was added to the mixture of dried fat-free egg with water, as shown in the flow sheet of the accompanying drawing, and the mixture homogenized and dried as described for the fat-free product of Examples 1 and 2.

The powdered egg product obtained had very good flavor, corresponding closely to that of fat-containing egg, and had less than 25 per cent of the cholesterol of a normal egg. It was stable and of good solubility.

EXAMPLE 4

The process of Example 3 was repeated except that instead of adding 25 per cent of normal egg fat, there was added vegetable margarine (free of cholesterol) in an amount equal to that of the normal amount of egg fat, so that the original egg fat of the whole egg was replaced with margarine, thus giving cholesterol-free powdered egg product containing fat in amount normally found in eggs, and of good flavor.

Similarly to Example 4, other fats and oils may be used, such as corn oil, coconut oil, or soybean oil, preferably containing a small and flavoring amount of a flavoring agent, such as butter flavor or the like. Also, butter or bacon flavored fat may be used to replace the egg fat. Maple, fruit flavors and the like may readily be incorporated. When adding fat to the product, such as corn oil, soybean oil, coconut oil or margarine, it is preferable to add an antioxidant to the oil prior to introducing the oil into the process. For example, .02 percent by weight of the oil butylated hydroxy toluene (BHT) should be added to corn oil or soybean oil or coconut oil prior to adding the oil to the product. The additives are preferably incorporated by adding to the dried fat-free egg, mixing with water and homogenizing. However, they could be added anytime after draining off the fat containing solvent, but a more uniform product is obtained by adding the fats and other additives before homogenizing.

EXAMPLE 5

The process of Example 1 was repeated utilizing hexane as the solvent in place of ethylene dichloride. The temperature of the egg-hexane mixture is maintained below about 40°C throughout the distillation processing by performing the distillation step under a partial vacuum, the temperature of the product being preferably maintained at about 35°C.

EXAMPLE 6

The process steps of Example 5 are followed in that emulsified mixture of the raw egg and hexane is delivered as a spray into the body of boiling hexane at a point just below the surface thereof. An azeotrope of solvent and water is removed by distillation until substantially all the water from the raw egg is withdrawn. The temperature of the egg solvent mixture is maintained at a temperature of about 35°C throughout the distillation process, and in all events less than 40.20 C. After substantial dehydration, the hexane containing the fat is removed by draining through a screen opening in the vessel and fresh solvent is added to the water dried product. The mixture is stirred and the solvent is again removed by draining through the opening in the vessel.

The process of Example 5 is then varied in that the drained egg product was then dried in a vacuum dryer at 200 mm of mercury and 30°C for 3 hours.

The dried product was mixed with water, homogenized and dried as in Example 5. The end product is similar to that obtained in Example 5 except the amount of hexane remaining in the product is substantially reduced, to the order of 10 parts per million.

EXAMPLE 7

The process of Example 6 was repeated except that corn oil in an amount equal to the egg fat removed from the product was added to the mixture of dried fat free egg with water, as shown in a sheet of the accompanying drawings, and the mixture homogenized and dried as described for the fat-free product of Examples 5 and 6.

EXAMPLE 8

The process of Example 7 is followed except that the solvent was heptane.

The egg product prepared according to the teachings of Examples 1–8 is analyzed to determine its protein and lipoprotein by the methods described in A.O.A.C. Methods of Analysis, 10th Ed.

The Food and Drug bacteriological method is employed to determine any salmonella infection. The cholesterol content is determined by the method described in Anal. Chem., Vol. 22, page 1,210 (1950). The presence of Salmonella infection is studied by the method described in the Bacteriological Analytical Manual, Food and Drug Administration, 1966.

The protein content of the fat free product, i.e., (the product prepared by Examples 1 or 2) was found to be about 75 percent by weight and the lipoprotein content about 9 percent by weight. The protein content quantity of egg products prepared by the prior art method of spray drying was found to have a protein quantity of 45 per cent or substantially lower than the protein quantity of the egg product of the present invention. The egg product of Examples 1, 2, 4, 5, 6, 7 and 8 was substantially free of cholesterol as compared to the original cholesterol levels and the cholesterol levels of the prior art spray dried egg products. The egg product of the invention is free of any Salmonella infection.

Protein Efficiency Ratio of Egg Product

The egg product prepared by the method of Examples 1–8 is subjected to Derse Assay for 4 weeks and compared with the recognized standard of casein (milk protein). The casein had a P.E.R. or protein efficiency ratio of 2.80 whereas the egg products of this invention had a P.E.R. or protein efficiency ratio of 4.03.

The improved egg product of this invention permits the product to be provided to the consumer in a packaged form because of its indefinite shelf-life which results in a stability heretofore unknown for dried egg products. It is recognized that the prior art egg products prepared by spray drying have limited stability in storage at room temperature.

It will also be appreciated that the substantial removal of cholesterol, up to about 96 per cent, or the substantial reduction of cholesterol makes the product attractive to those many consumers who diligently attempt to avoid cholesterol in their diets.

The elimination of the problem of pathogenic organisms, namely, Salmonella, is a marked improvement because prior art egg products prepared by spray drying require pasteurization to eliminate this problem. This pasteurization step is cumbersome and uneconomical because it is a sensitive procedure. If pasteurization exceeds a predetermined upward temperature level, coagulation of protein occurs which will frustrate attempts to dissolve the powdered egg product in water prior to cooking. If a lower pasteurization level is not attained, then the pathogenic organism is not destroyed. Such an added procedure is never required with the egg product of the present invention because Salmonella infection is entirely eliminated by the presence of the fat organic solvent, particularly a halogenated hydrocarbon solvent.

Not only are the trace levels of ethylene dichloride nontoxic, but the ethylene dichloride tends to become volatilized upon cooking of the egg product. The instant egg product undergoes ready admixture with added water and cooks to a homogenous and good appearance. The improved resistance to insect infestation, imparts additional advantages relative to the feature of storage, since the likelihood of this potential hazard is reduced.

The egg oil, which is contained in the miscella, drained from the egg solids after evaporation of the water solvent azeotrope, is in itself a valuable product. As indicated in the flow sheet, the solvent is vacuum distilled from the egg oil and the egg oil collected in a storage tank.

The egg oil will contain the phosphatides present in the egg if the extraction is performed with a polar or partial polar solvent, such as ethylene dichloride, which is not the case of egg oil extracted with a non-polar solvent such as heptane or hexane. Egg oil containing the phosphatides of the egg is a particularly valuable product, since it is an emulsifying agent and suitable for use in cosmetics. Egg oil produced in this manner is made stable by addition of an antioxidant. For example, 0.02 per cent butylated hydroxytoluene (BHT) by weight of the oil is added to the egg oil and produces a stable product. While the phosphatides are valuable constituents of egg oil, they are undesirable in the egg solids since they adversely affect stability and taste.

Egg powder produced in accordance with this invention is in the raw state, that is, the product retains the water soluable coaguables and the enzymes of raw egg.

The invention may now be practiced in the various ways which will occur to practitioners, and all such practice is intended to be a part of the present invention provided it comes within the terms of the following claims as given further meaning by the language of the preceding specification.

I claim:

1. A dehydrated egg powder, said powder being substantially free of water, said powder containing less than 5% free egg fat by weight, and said powder containing between 10 and 100 parts per million of fat solvent, and said powder containing an antioxidant.

2. A process of producing a nutritious egg product which comprises the steps of
   a. mixing raw eggs with a body or organic liquid fat solvent capable of forming an azeotrope with water and which is nontoxic to humans at levels of below 100 parts per million.
   b. heating the body of solvent and eggs to a temperature of below the coagulation temperature of the eggs to cause vapor of azeotrope formed by the solvent and water from the eggs to boil off from the solvent body, and extracting the dehydrated egg product so obtained with said organic liquid fat solvent,
   c. removing the fat containing solvent from the egg product to obtain a substantially dehydrated and fat-free egg product,
   d. thereafter adding water to said product in an amount sufficient to form a flowable mixture and
   e. thereafter drying said product to obtain a dry, substantially solvent-free egg product.

3. A process according to claim 2 in which a fat antioxidant is introduced into the product before drying said product.

4. A process according to claim 2 in which the organic fat solvent is a chlorinated hydrocarbon.

5. A process according to claim 2 in which the organic fat solvent is ethylene dichloride.

6. A process in accordance with claim 5 in which the process of removing solvent is carried out so as to retain from 60–100 parts per million of ethylene dichloride in the final product.

7. A process in accordance with claim 2 wherein egg fat in substantially lesser proportion than that present in the original eggs is introduced into the dry fat-free egg product after the extraction step and prior to final drying.

8. A process in accordance with claim 7 in which the egg fat is homogenized with the water and dry egg product and then the homogenized mixture dried.

9. A process in accordance with claim 2 in which the removed egg fat is replaced by mixing a cholesterol-free edible fat or oil with the water and fat-free egg product prior to final drying.

10. A process in accordance with claim 9 in which the cholesterol free fat or oil contains a flavoring agent.

11. A process according to claim 9 wherein the fat is margarine.

12. A process according to claim 2 in which butter is mixed with the water-free egg product prior to final drying.

13. A process according to claim 2 in which the organic fat solvent is heptane.

14. A process according to claim 2 in which the organic fat solvent is hexane.

15. A process in accordance with claim 9 wherein the fat is corn oil.

16. In the process of producing a substantially water-free, nutritious egg product in which raw eggs are mixed with an organic liquid fat solvent which forms an azeotrope with water, the water removed by distilling off the solvent-water azeotrope, and the fat of the egg extracted with an organic liquid fat solvent to obtain a substantially water-free egg product containing at least trace amounts of organic liquid fat solvent, the improvement which comprises mixing said water-free egg product with water and evaporating water and solvent from said egg product and water mixture so as to obtain a substantially dry and substantially solventfree egg product.

17. A process according to claim 16 in which the egg product and water are homogenized before final drying.

18. A process according to claim 16 in which the egg product and water are homogenized with added edible fat before final drying.

19. A process for removing fat solvent from dehydrated and defatted egg containing fat solvent which comprises homogenizing said egg product in water, and drying said homogenized mixture while maintaining said mixture below the coagulation temperature of the egg.

20. The process according to claim 19 in which the fat solvent is a water immiscible liquid.

21. The process according to claim 19 in which the fat solvent is ethylene dichloride.

* * * * *

UNITED STATES PATENT OFFICE
CERTIFICATE OF CORRECTION

Patent No. 3,881,034          Dated April 29, 1975

Inventor(s) Ezra Levin

It is certified that error appears in the above-identified patent and that said Letters Patent are hereby corrected as shown below:

In the grant (only), insert Columns 7 and 8, as part of Letters Patent 3,881,034.

Signed and Sealed this twenty-third Day of September 1975

[SEAL]

Attest:

RUTH C. MASON
*Attesting Officer*

C. MARSHALL DANN
*Commissioner of Patents and Trademarks*